United States Patent [19]

Yabushita et al.

[11] Patent Number: 5,393,467
[45] Date of Patent: Feb. 28, 1995

[54] ELECTRICALLY CONDUCTIVE RUBBER MATERIAL USED FOR ELECTROPHOTOGRAPHIC COPYING APPARATUS

[75] Inventors: Shunichi Yabushita, Akashi; Hitoshi Itani, Kobe, both of Japan

[73] Assignee: Sumitomo Rubber Industries, Ltd., Kobe, Japan

[21] Appl. No.: 71,018

[22] Filed: Jun. 2, 1993

[30] Foreign Application Priority Data

Jun. 4, 1992 [JP] Japan ............................. 4-143079
Apr. 21, 1993 [JP] Japan ............................. 5-093489

[51] Int. Cl.$^6$ .................. H01B 1/00; H01B 1/20; H01B 1/24
[52] U.S. Cl. .................. 252/511; 252/502; 252/510; 524/495; 524/496
[58] Field of Search ......... 252/502, 510, 511; 524/495, 496

[56] References Cited

U.S. PATENT DOCUMENTS

| | | | |
|---|---|---|---|
| 4,076,652 | 2/1978 | Ganci et al. | 252/504 |
| 4,278,510 | 7/1981 | Chien et al. | 252/511 |
| 5,209,872 | 5/1993 | Takahashi et al. | 252/511 |
| 5,248,553 | 9/1993 | Miyashita et al. | 252/511 |

*Primary Examiner*—Paul Lieberman
*Assistant Examiner*—M. Kopec
*Attorney, Agent, or Firm*—Nikaido, Marmelstein, Murray & Oram

[57] ABSTRACT

The invention provides an electrically conductive rubber material for use in an electrophotographic copying apparatus of a composition which will prevent bleeding and blooming so as to obtain a image of high quality.

The electrically conductive rubber material comprises a diene type rubber and a rubber which contains no double bond in its principal chain, which rubber is cross-linked with a metallic salt cross-linking agent. A portion of the diene type rubber butadiene rubber in a proportion to the total parts by weight of rubber of 10–30 parts by weight. The proportion of the rubber containing no double bond in its principal chain to the total parts by weight of rubber is not less than 15 parts by weights. 5–100 parts by weight of carbon black per 100 parts by weight of rubber are added to serve as an electrical conductivity imparting agent. Not more than 3 parts by weight of oil ingredient, use as a softening agent, plasticizer and the like, per 100 parts by weight of rubber as measured by solvent extraction by acetone is also permitted. Preferably, the rubber containing no double bond in its principal chain is EPDM rubber.

7 Claims, No Drawings

ELECTRICALLY CONDUCTIVE RUBBER MATERIAL USED FOR ELECTROPHOTOGRAPHIC COPYING APPARATUS

BACKGROUND OF THE INVENTION

The present invention relates to improvement in an electrically conductive rubber material used as a charging member for electrophotographic copying apparatus.

An electrophotographic copying apparatus operates by forming an electrostatic latent image on the surface of a photoreceptor, applying toner thereto to form a toner image, and transferring said toner image to a copying paper sheet. In this case, for production of electrostatic latent images, use has heretofore been made of the corona discharging system, which, however, raises such problems as ozone emission and use of high voltages. Thus, the recent tendency has been to avoid using the corona discharging system and there has been investigated a contact charging system in which the photoreceptor surface is charged by being contacted with a charging member made of electrically conductive rubber or the like.

In the contact charging system, however, the charging member is in contact with the photoreceptor surface, so that the bleeding of oil ingredient, such as a softening agent, plasticizer and the like, and the blooming of a cross-linking agent of the sulfur type on the electrically conductive rubber used as the charging member may damage a resin film on the photoreceptor surface and deform the copy image.

The rubber usually includes oily ingredients, such as a softening agent, plasticizer and the like, which is added to the rubber to lower the hardness thereof and to provide easier processing therefor. If, however, too much oil ingredient, of a softening agent and plasticizer, is added, some of the oil ingredient of the softening agent and plasticizer could microscopically bleed on to the rubber surface, though not visible to the naked eye. Therefore, in an electrophotographic copying apparatus, such a rubber material may cause contamination of or damage to the photoreceptor due to the bleeding of the oil ingredient of the softening agent and plasticizer as well as deformation of the copy image due to the contamination of the photoreceptor. Further, if a cross-linking agent of the sulfur type is used for the rubber, it bleeds microscopically on to the rubber surface like said oil ingredient of the softening agent and plasticizer to contaminate or damage the photoreceptor and to deform the copy image.

SUMMARY OF THE INVENTION

The present invention has been accomplished with the above in mind and is intended to provide an electrically conductive rubber material used for electrophotographic copying apparatus which prevents bleeding and blooming so as to provide a copy image of high quality.

We have repeated various experiments to achieve said object and have succeeded In providing an electrically conductive rubber material suitable for use for electrophotographic copying apparatus which prevents bleeding and blooming while practicably satisfying electrical conductivity, processability and other various physical properties.

In the electrically conductive rubber material, a diene type rubber is used. As for the diene type rubber in the electrically conductive member of the present invention, mention may be made of butadiene rubber, which has a conjugated double bond and is superior in cross-linkability. Metallic salt cross-linking is employed in the electrically conductive material of the present invention. For the cross-linking of rubber, there are various types of cross-linking, such as sulfur cross-linking, peroxide cross-linking, and metallic salt cross-linking, Sulfur cross-linking causes said problems including photoreceptor contamination, while peroxide cross-linking presents the problem that the tear strength thereof is lower and the elongation thereof is poorer at the same hardness as that of the metallic salt cross-linking. Therefore, the electrically conductive rubber material of the present invention comprises butadiene cross-linked with a metallic salt. In the electrically conductive rubber material of the present invention, the proportion of butadiene rubber to the total parts by weight of rubber is suitably 10–30 parts by weight. The reason why the proportion of butadiene rubber to the total parts by weight of rubber is suitably 10–30 parts by weight is that if butadiene rubber is less than 10 parts by weight a desired rubber hardness cannot be obtained while if it exceeds 30 parts by weight the rubber becomes too hard to be used as a roller requiring a precision for an electrophotographic copying apparatus, because of the assembling tolerance of a roller and other problems. Such a hard roller being in contact with the photoreceptor tends to scratch the photoreceptor. Metallic salt monomers are used as cross-linking agents, which comprise monomers, metallic salts of: methacrylic acid, acrylic acid, itaconic acid, and crotonic acid, and metallic oxides, such as zinc oxide and magnesium oxide. Particularly suitable is a mixture comprising a metallic salt of methacrylic acid and magnesium oxide. Organic peroxide is mixed as initiator with a metallic salt monomer of the cross-linking agent.

The electrically conductive rubber material of the present invention comprises carbon black added thereto for electrical conductivity. Usually, in order to impart electrical conductivity to the rubber, an electrically conductive substance, such as metal, electrically conductive plasticizer, carbon black or the like, is added to the rubber. However, an electrically conductive rubber material included in a metal electrophotographic copying apparatus tends to scratch the photoreceptor of an electrophotographic copying apparatus, while an electrically conductive rubber material using an electrically conductive plasticizer is liable to cause bleeding. Thus, it is most suitable to use carbon black. The amount of carbon black to be added in the electrically conductive rubber material of the present invention is suitably 5–100 parts by weight per 100 parts by weight of rubber. The reason why the amount of carbon black to be added is restricted to 5–100 parts by weight per 100 parts by weight of rubber is that if carbon black is less than 5 parts by weight, sufficient electrical conductivity cannot be obtained and if carbon black is more than 100 parts by weight, the rubber hardness is too high, thus aggravating processability. The kinds of carbon black suitable for use in the present invention are SAF, HAF, GPF, SRF, acetylene black and ketjen black, any of which may be used.

The electrically conductive rubber material of the invention comprises a suitable amount of oil ingredient used as a softening agent, plasticizer and the like. The amount of oil ingredient of a softening agent and plasticizer in the electrically conductive rubber material of the invention is, when extracted by solvent extraction by acetone, suitably not more than 3 parts by weight per 100 parts by weight of rubber. The reason why the amount of extracted oil ingredient of a softening agent and plasticizer to be added is restricted to not more than 3 parts by weight is that if it exceeds 3 parts by weight, this undesirably causes bleeding. Naphthenic oil and paraffin oil, etc. can be used for the oil of a softening agent and plasticizer.

The electrically conductive rubber material of the invention has ozone resistance by being blended with a rubber which is superior in ozone resistance and has no double bond in its principal chain. Since ozone is generated in an electrophotographic copying apparatus, it is usually desired for the electrically conductive rubber material for such electrophotographic copying apparatus to have ozone resistance. Of those rubbers which are superior in ozone resistance and have no double bond in their principal chain, silicone rubber, urethane rubber, and EPDM rubber may be exemplified. However, due to the solubility index (SP value) of butadiene rubber, blending EPDM rubber is desirable in the present invention. The proportion of EPDM rubber to the total parts by weight of rubber is not less than 15 parts by weight, and preferably not less than 30 parts by weight. If the proportion of EPDM rubber to the total parts by weight of rubber is less than 15 parts by weight, the need for ozone resistance cannot be satisfied.

In the electrically conductive rubber material of the invention, any rubbers other than those exemplified above may be blended, provided they contain no double bond in their principal chain.

That is, the present invention provides an electrically conductive rubber material for electrophotographic copying apparatus, said rubber material comprising a diene type rubber and a rubber which contains no double bond in its principal chain, said rubber being cross-linked by metallic salt cross-linking, wherein a portion of said diene type rubber being butadiene rubber. The proportion of said butadiene rubber to the total parts by weight of rubber is 10–30 parts by rubber. The proportion of rubber having no double bond in its principal chain to the total parts by weight of rubber is not less than 30 parts by weight. 5–100 Parts by weight of carbon black per 100 parts by weight of rubber serves as an electrical conductivity imparting agent, and not more than 3 parts by weight of solvent-extracted oil ingredient of a softening agent and plasticizer, is added per 100 parts by weight of rubber.

Further, the invention provides an electrically conductive rubber material for electrophotographic copying apparatus, wherein said rubber containing no double bond in its principal chain is EPDM rubber.

According to the present invention, a diene type rubber and a rubber containing no double bond in its principal chain are cross-linked with a metallic salt cross-linking, and bleeding and blooming may be prevented by optimumly controlling the proportion of said rubbers and the amounts of carbon black, oil ingredient of a softening agent and plasticizer to be added, while practicably satisfying the electrical conductivity, processability and other physical properties.

Good ozone resistance has been obtained by using EPDM rubber as a rubber comprising no double bond in its principal chain.

DESCRIPTION OF THE PREFERRED EMBODIMENTS

Referring to Embodiments 1 through 7 of the invention, experiments have been conducted as to electrical conductivity, occurrence of bleeding, processability, ozone resistance and other physical properties (tear strength, elongation and hardness), and the results of them are shown in Table 1 below, together with Comparative Examples 1 through 10.

TABLE 1

| | Comparative Example 1 | Embodiment 1 | Embodiment 2 | Comparative Example 2 |
|---|---|---|---|---|
| BR[1] | 5 | 10 | 30 | 40 |
| EPDM[2] | 30 | 30 | 30 | 30 |
| NR[3] | 65 | 60 | 40 | 30 |
| CARBON (FEF) | 60 | 60 | 60 | 60 |
| Naphthenic oil (note 1) | 0 | 0 | 0 | 0 |
| Methacrylic acid | 1 | 1 | 1 | 1 |
| DCP[4] | 0.5 | 0.5 | 0.5 | 0.5 |
| Volume resistivity ($\Omega$ cm) | $7 \times 10^7$ | $5 \times 10^7$ | $8 \times 10^6$ | $7 \times 10^6$ |
| Occurrence of bleeding | No | No | No | No |
| Processability | No | Ok | Ok | No |
| Ozone resistance | Ok | Ok | Ok | Ok |
| Tear strength (kg/cm) | 30 | 43 | 55 | 60 |
| Elongation (%) | 500 | 500 | 450 | 350 |
| Hardness (JIS-A) | 42 | 45 | 60 | 80 |

| | Comparative Example 3 | Embodiment 3 | Embodiment 4 | Comparative Example 4 |
|---|---|---|---|---|
| BR[1] | 10 | 10 | 10 | 10 |
| EPDM[2] | 30 | 30 | 30 | 30 |
| NR[3] | 60 | 60 | 60 | 60 |
| CARBON (FEF) | 3 | 5 | 100 | 120 |
| Naphthenic oil (note 1) | 0 | 0 | 0 | 0 |
| Methacrylic acid | 1 | 1 | 1 | 1 |
| DCP[4] | 0.5 | 0.5 | 0.5 | 0.5 |
| Volume resistivity ($\Omega$ cm) | $1 \times 10^{13}$ | $5 \times 10^{11}$ | $2 \times 10^2$ | $1 \times 10^2$ |
| Occurrence of bleeding | No | No | No | No |
| Processability | Ok | Ok | Ok | No |
| Ozone resistance | Ok | Ok | Ok | Ok |
| Tear strength (kg/cm) | | | | |
| Elongation (%) | | | | |
| Hardness (JIS-A) | | | | |

| | Embodiment 5 | Comparative Example 5 | Comparative Example 6 | Embodiment 6 |
|---|---|---|---|---|
| BR[1] | 10 | 10 | 10 | 10 |
| EPDM[2] | 30 | 30 | 0 | 15 |
| NR[3] | 60 | 60 | 90 | 75 |
| CARBON (FEF) | 60 | 60 | 60 | 60 |
| Naphthenic oil (note 1) | 3 | 30 | 0 | 0 |
| Methacrylic acid | 1 | 1 | 1 | 1 |
| DCP[4] | 0.5 | 0.5 | 0.5 | 0.5 |
| Volume resistivity ($\Omega$ cm) | $7 \times 10^7$ | $4 \times 10^9$ | $1 \times 10^6$ | $8 \times 10^6$ |
| Occurrence of bleeding | No | Yes | No | No |
| Processability | Ok | Ok | Ok | Ok |
| Ozone | Ok | Ok | No | Ok |

TABLE 1-continued resistance
Tear strength
(kg/cm)
Elongation (%)
Hardness (JIS-A)

|  | Embodiment 7 | Comp. Ex. 7 | Comp. Ex. 8 | Comp. Ex. 9 | Comparative Example 10 |
|---|---|---|---|---|---|
| BR[1] | 10 | 10 | 10 | 0 | 0 |
| EPDM[2] | 30 | 30 | 30 | 100 | 100 |
| NR[3] | 60 | 60 | 60 | 0 | 0 |
| CARBON (FEF) | 60 | 60 | 60 | 60 | 60 |
| Naphthenic oil (note 1) | 0 | 0 | 0 | 0 | 0 |
| Methacrylic acid | 1 | 0 | 0 | 1 | 0 |
| DCP[4] | 1 | 0.5 | 1 | 0.5 | 0.5 |
| Volume resistivity ($\Omega$ cm) | $1 \times 10^7$ | $3 \times 10^5$ | $1 \times 10^5$ | $7 \times 10^6$ | $7 \times 10^6$ |
| Occurrence of bleeding | No | No | No | No | No |
| Processability | Ok | No | No | No | No |
| Ozone resistance | Ok | Ok | Ok | Ok | Ok |
| Tear strength (kg/cm) | 45 | 30 | 32 | 24 | 21 |
| Elongation (%) | 480 | 350 | 300 | 530 | 550 |
| Hardness (JIS-A) | 48 | 45 | 58 | 39 | 39 |

(Note: weight of extracted oil by acetone)
[1] = butadiene rubber
[2] = ethylene propylene diene rubber
[3] = natural rubber
[4] = dicumyl peroxide Experiments concerning the electrical conductivity of the rubber materials were conducted by preparing materials in the proportions shown in Table 1, kneading and vulcanizing them in the usual manner, molding them to form 10 cm×10 cm square rubber plates and measuring them for their volume resistivities.

Experiments concerning the occurrence of bleeding of rubber materials have been conducted by preparing materials in the proportions shown in Table 1 and kneading them in the usual manner, vulcanizing them on the outer peripheries of metal shafts of 6 mm in diameter in the usual manner, molding them to form electrically conductive rolls having an outer diameter of 12 mm, placing said electrically conductive rolls in an atmosphere at 60° C. with a load of 1 kg put on each of them and in contact with a glass plate, leaving them in this state for two weeks, and visually observing the presence or absence of oil on the glass surface.

Experiments concerning the processability of rubber materials have been conducted by preparing materials in the proportions shown in Table 1, kneading and vulcanizing them in the usual manner to form samples, processing these samples. And those easy to process are marked with Ok and those difficult to process are marked with No.

Experiments concerning ozone resistance have been conducted by preparing materials in the proportions shown in Table 1 kneading them in the usual manner, vulcanizing them on the outer peripheries of metal shafts of 6 mm in diameter in the usual manner, molding them to form electrically conductive rolls having an outer diameter of 12 mm, and installing said electrically conductive rolls in an electrophotographic copying apparatus to observe their ozone resistance. And those which satisfy ozone resistance are marked with Ok and those which do not are marked with No.

Experiments concerning the physical properties of rubber materials have been conducted by preparing materials in the proportions shown in Table 1, kneading and vulcanizing them in the usual manner to form samples and testing said samples for tear strength, elongation and hardness according to JIS K6301.

As the results of these experiments, it is seen from Embodiments 1 and 2 and Comparative Examples 1, 2, 9 and 10 that the proportion of butadiene to the total parts by weight of rubber is suitably 10–30 parts by weight. That is, in Comparative Example 1 with 5 parts by weight of butadiene and in Comparative Examples 9 and 10 with no butadiene contained, the materials are too soft, aggravating processability and the tear strength is low. In comparative Example 2 with 40 parts by weight of butadiene, the material is too hard, aggravating processability and the elongation is low. In contrast, in Embodiments 1 and 2 with 10 and 30 parts by weight of butadiene, respectively, the hardness is optimum, the processability is good and the tear strength and elongation are both high.

It is seen from Embodiments 1, 3 and 4 and Comparative Examples 3 and 4 that the amount of carbon black to be added is suitably 5–100 parts by weight per 100 parts by weight of rubber. That is, in Comparative Example 3 with 3 parts by weight of carbon black, the volume resistivity is too high for the material to become an electrically conductive rubber, and in Comparative Example 4 with 120 parts by weight of carbon black, the carbon black excessively increases the hardness and aggravates processability. In contrast, in Embodiments 1, 3 and 4 with 60, 5 and 100 parts by weight of carbon black, respectively, the volume resistivity is sufficiently low to provide good electrical conductivity and the processability is also good.

It is seen from Embodiments 1 and 5 and Comparative Example 5 that the amount of oil ingredient of a softening agent and plasticizer is suitably not more than 3 parts by weight per 100 parts by weight of rubber in accordance with solvent extraction by acetone. That is, in Comparative Example 5 with 30 parts by weight of oil ingredient of a softening agent and plasticizer, bleeding has been observed and it is unsuitable for use for electrophotographic copying apparatus. In contrast, in Embodiments 1 and 5 with 0 and 3 parts by weight of oil ingredient of a softening agent and plasticizer, no bleeding has been observed.

It is seen from Embodiments 1 and 6 and Comparative Example 6 that the proportion of EPDM rubber to the total parts by weight of rubber is desirably not less than 15 parts by weight. That is, in Comparative Example 6 with zero parts by weight of EPDM rubber, the ozone resistance is not satisfactory, whereas in Embodiments 1 and 6 with 30 and 15 parts by weight of EPDM rubber, the ozone resistance is satisfactory. The proportion of EPDM rubber to the total parts by weight of rubber may be not less than 15 parts by weight but more desirably is not less than 30 parts by weight.

It is seen from Embodiments 1 and 7 and Comparative Examples 7 and 8 that metallic salt cross-linking is suitable. That is, in Comparative Examples 7 and 8 with peroxide cross-linking, the tear strength and elongation are low and processability is poor. In contrast, in Embodiments 1 and 7 with metallic salt cross-linking, the tear strength and elongation are high and processability is good.

As has so far been described, the electrically conductive rubber material of the present invention comprises a diene type rubber and a rubber which contains no double bond in its principal chain and those rubbers have been cross-linked with a metallic salt cross-linking, the proportion of said rubber and the amounts of carbon black and oil ingredient being optimized, wherein EPDM rubber having a good ozone resistance is blended therewith, thereby allowing to minimize the amount of oil ingredient of a softening agent and plasticizer, which are liable to cause bleeding, and to eliminate the use of a vulcanizing agent of the sulfur type, which is liable to cause blooming. In this manner the invention prevents bleeding and blooming while satisfying the electrical conductivity, processability and other various physical properties and proving good ozone resistance and, when used for electrophotographic copying apparatus, the invention makes it possible to obtain a image of high quality for a prolonged period of time.

What is claimed is:

1. An electrically conductive rubber material for a charging member of an electrophotographic copying apparatus, comprising:
    100 parts by weight of total rubber comprising:
        synthetic rubber consisting essentially of:
            10 to 30 parts by weight, per 100 parts by weight of total rubber, of a diene rubber comprising butadiene,
            at least 15 parts by weight, per 100 parts of total rubber, of EPDM rubber which contains no double bond in its principal chain; and
            a metallic salt cross linking agent;
        5-100 parts by weight of carbon black, per 100 parts by weight of total rubber, sufficient to impart electrical conductivity to said rubber material; and
        not more than 3 parts by weight of oil, per 100 parts by weight of total rubber, as measured by solvent extraction by acetone.

2. In an electrically conductive rubber material for use as a charging member for an electrophotocopying apparatus, which rubber comprises:
    100 parts by weight of total rubber comprising:
        synthetic rubber consisting essentially of:
            a diene rubber comprising butadiene rubber, and EPDM rubber containing no double bonds in the principal chain thereof,
    a cross linking agent,
    a conductivity enhancing additive, and
    at least one oily component;
        the improvement, whereby at least reducing bleeding of said oily component out of said rubber material, and blooming of a cross linking agent comprising sulfur, out of said rubber, which improvement comprises:
    said cross linking agent consisting essentially of a metal salt,
    said oily component consisting essentially of not more than 3 parts by weight, as measured by solvent extraction in acetone, per 100 parts by weight of total rubber,
    said carbon black consisting essentially of a conductivity enhancing amount of 5 to 100 parts by weight per 100 parts by weight of total rubber,
    said total rubber comprising 10 to 30 parts by weight of butadiene rubber per 100 parts by weight of said total rubber; and
    said EPDM rubber comprising at least 15 parts by weight per 100 parts by weight of total rubber.

3. An improved rubber as claimed in claim 2 wherein said oily component comprises at least one member of the group consisting of softening agent and plasticizer.

4. An improved rubber as claimed in claim 2 wherein said cross linking agent is a metallic salt of at least one polymerizable moiety selected from the group consisting of methacrylic acid, acrylic acid, itaconic acid and crotonic acid.

5. An improved rubber as claimed in claim 2 wherein said cross linking agent is at least one member selected from the group consisting of zinc oxide and magnesium oxide.

6. An improved rubber as claimed in claim 2 wherein said cross linking agent is combined with a cross linking initiator.

7. An improved rubber as claimed in claim 2 wherein said EPDM rubber is present in said rubber in a proportion of at least 30 parts.

* * * * *